(12) United States Patent
Hierl et al.

(10) Patent No.: US 11,894,587 B2
(45) Date of Patent: Feb. 6, 2024

(54) ENERGY SYSTEM AND METHOD FOR LINE PRESSURE MONITORING

(71) Applicant: HPS Home Power Solutions GmbH, Berlin (DE)

(72) Inventors: Andreas Hierl, Berlin (DE); Jonas Schulte, Berlin (DE); Hendrik Leverenz, Berlin (DE)

(*) Notice: Subject to any disclaimer, the term of this patent is extended or adjusted under 35 U.S.C. 154(b) by 256 days.

(21) Appl. No.: 17/416,688

(22) PCT Filed: Dec. 18, 2019

(86) PCT No.: PCT/EP2019/086029
§ 371 (c)(1),
(2) Date: Jun. 21, 2021

(87) PCT Pub. No.: WO2020/127540
PCT Pub. Date: Jun. 25, 2020

(65) Prior Publication Data
US 2022/0069324 A1    Mar. 3, 2022

(30) Foreign Application Priority Data
Dec. 20, 2018 (DE) .................... 10 2018 133 206.8

(51) Int. Cl.
*H01M 8/0438* (2016.01)
*C25B 9/17* (2021.01)
(Continued)

(52) U.S. Cl.
CPC .......... *H01M 8/04425* (2013.01); *C25B 1/04* (2013.01); *C25B 9/17* (2021.01); *C25B 15/02* (2013.01);
(Continued)

(58) Field of Classification Search
CPC ......... H01M 8/04425; H01M 8/04201; H01M 8/04432; H01M 8/04664; H01M 8/0656;
(Continued)

(56) References Cited

U.S. PATENT DOCUMENTS

| | | |
|---|---|---|
| 2004/0013923 A1 | 1/2004 | Molter et al. |
| 2008/0008921 A1 | 1/2008 | Miura |

(Continued)

FOREIGN PATENT DOCUMENTS

| | | |
|---|---|---|
| DE | 102015209875 | 12/2016 |
| WO | WO2008071402 | 6/2008 |

(Continued)

*Primary Examiner* — Sarah A. Slifka
(74) *Attorney, Agent, or Firm* — Pandiscio & Pandiscio

(57) ABSTRACT

The invention relates to a method for line pressure monitoring, in particular for detecting leaks, in a bidirectionally used line section (40a) of a connection line unit (40) in an energy system (10), in particular in a domestic energy system, as well as an energy system (10) of this type, wherein a first energy source unit (21) and a first energy sink unit (22) are positioned on the first side (43) of the bidirectional line section (40a), and wherein a second energy source unit (31) and a second energy sink unit (32) are positioned on the second side (44) of the bidirectional line section (40a). In order to provide a secure monitoring of a bidirectional line, according to the invention, using two pressure measuring devices (50, 51) positioned spatially separate from one another in the bidirectional line section (40a), a first pressure (P1) and a second pressure (P2) present at the locations of the pressure measuring devices (50, 51) are detected, and, in particular in a control device (60) of the energy system (10), a monitoring of the line pressure in the bidirectional line section (40a) is carried out by means of an evaluation of the pressures (P1, P2) detected by the pressure measuring devices (50, 51), wherein the (Continued)

detected pressures (P1, P2) are placed in relation to one another in different ways.

26 Claims, 3 Drawing Sheets

(51) Int. Cl.
  C25B 1/04       (2021.01)
  C25B 15/02      (2021.01)
  H01M 8/04082    (2016.01)
  H01M 8/04664    (2016.01)
  H01M 8/0656     (2016.01)
  H01M 16/00      (2006.01)

(52) U.S. Cl.
  CPC ... *H01M 8/04201* (2013.01); *H01M 8/04432* (2013.01); *H01M 8/04664* (2013.01); *H01M 8/0656* (2013.01); *H01M 16/003* (2013.01); *H01M 2250/10* (2013.01)

(58) Field of Classification Search
  CPC .......... H01M 16/003; C25B 1/04; C25B 9/17; C25B 15/02
  See application file for complete search history.

(56) References Cited

U.S. PATENT DOCUMENTS

| | | |
|---|---|---|
| 2008/0096059 A1 | 4/2008 | Kanie |
| 2009/0239105 A1 | 9/2009 | Yoshida |

FOREIGN PATENT DOCUMENTS

| | | |
|---|---|---|
| WO | WO2017089468 | 6/2017 |
| WO | WO2017089469 | 6/2017 |

ENERGY SYSTEM AND METHOD FOR LINE PRESSURE MONITORING

REFERENCE TO PENDING PRIOR PATENT APPLICATIONS

This patent application claims benefit of International (PCT) Patent Application No. PCT/EP2019/086029, filed 18 Dec. 2019 by HPS Home Power Solutions GmbH for ENERGY SYSTEM AND METHOD FOR LINE PRESSURE MONITORING, which in turn claims benefit of German Patent Application No. DE 10 2018 133 206.8, filed 20 Dec. 2018.

The two (2) above-identified patent applications are hereby incorporated herein by reference.

FIELD OF THE INVENTION

The present invention first relates to a method for line pressure monitoring in an energy system according to the preamble of independent claim 1. The invention further relates to an energy system.

BACKGROUND OF THE INVENTION

Energy systems of the generic type are already known in many ways in the prior art. Such systems are commonly used to generate and provide energy for a wide variety of fields of application.

In a known type of such energy systems, energy is generated in a first energy source. The energy generated may be, for example, hydrogen H2. The hydrogen is produced, for example, by means of electrolysis and it is stored in a second energy source device, which is, for example, a storage device. This is, for example, a first mode of operation of the energy system. During the operation of the energy system, the hydrogen is withdrawn from the storage device and consumed in a first energy sink device. This is, for example, a second mode of operation of the energy system. Such a first energy sink device is, for example, a fuel cell device. Usually, the aforementioned components of the energy system are spatially separated from one another and are connected to one another via a connecting line device. Both of the aforementioned modes of operation usually require a different pressure level. While, for example, pressures of 20 to 60 bar prevail in the first mode of operation with the electrolysis, for the operation of the fuel cell device in the second mode of operation, pressures of, for example, less than 20 bar are required.

For this reason, in known energy systems, the different operating modes are usually carried out separated from one another in line sections of the connecting line device being separated from another. Via first line sections of the connecting line device, which serve solely for storing, the generated hydrogen is transported from the first energy source device to the second energy source device with the first pressure present in the process. Via second line sections of the connecting line device, which serve solely for withdrawal, the hydrogen stored in the second energy source device is transported with the second pressure required for this purpose to the first energy sink device and consumed there.

Such a known energy system is disclosed, for example, in DE 103 07 112 A1. The disadvantage of this known energy system is that, because of the different pressures, the connecting line device has different line sections, which in each case are used only in the first mode of operation or in the second mode of operation of the energy system. This is complicated in terms of construction and is also expensive because of the special requirements of the lines. In addition, there is the problem that, the more line sections are present, even more leakages in the connecting line device can occur.

There is therefore a need to reduce the number of components required in the energy system.

In principle, it has already become known for this purpose to use bidirectional lines which can be flowed through selectively in different directions. For example, an energy system is known from DE 10 2015 209 875 A1, which is based on one electrolyser and a gas boiler, wherein the energy system comprises a bidirectionally used line section.

In the embodiment of the energy system described above, both an energy source device and an energy sink device are located on both sides of the bidirectionally used line. If a small or partial leakage occurs during the operation of the energy system, that is, during gas from the energy source device flows to the energy sink device, the gas can escape from the leakage. This is very problematic and dangerous, in particular in the case of hydrogen, and must therefore be prevented, in any case detected as quickly as possible, so that countermeasures can be taken as early as possible. Under certain circumstances, a simple pressure drop below the limit pressure reacts only very slowly and is therefore not sufficient. In the worst case, in the case of a volume flow of the leakage which, according to the formula $\dot{V}_{leakage} < \dot{V}_{source}$ is smaller than the volume flow of the energy source device, and a pressure measurement at the energy source device even does not lead to a triggering of a limit pressure drop.

The line pressure must therefore be monitored. A method for line pressure monitoring is described in DE 11 2006 001 772 T5, wherein in order to determine leakages, two pressure measuring devices are used in a line section, said pressure measuring devices being located spatially separated from one another in the line section. In particular in the case of lines being used bidirectionally, in which the volume flows in both directions through the bidirectional line, the monitoring of the line pressure is not trivial.

SUMMARY OF THE INVENTION

Therefore, it is the object of the present invention to further develop a method of the type mentioned at the beginning as well as to provide an energy system, in which the above-mentioned disadvantages can be avoided. In particular, it is intended to provide a possibility for a reliable monitoring of a bidirectional line.

According to the invention, this object is achieved by the method comprising the features according to the independent claim 1, which represents the first aspect of the invention, and by the energy system comprising the features according to the independent claim 10, which represents the second aspect of the invention. Further features and details of the invention become apparent from the dependent claims, from the description and from the drawings. In this context, features and details which are disclosed in connection with the first aspect of the invention apply to their full extent also in connection with the second aspect of the invention, and vice versa, so that with regard to the disclosure of these two aspects of the invention, full reference is always made to the other aspect of the invention respectively.

The basic idea of the present invention is a particular arrangement of pressure measuring devices and the evaluation of the pressures measured by the pressure measuring devices for reliably monitoring a bidirectional line, in particular a bidirectional gas line.

The solution according to the invention provides a line pressure monitoring which is independent of the direction of use of the bidirectional line. According to the invention, sensitive line pressure monitoring in various operating modes or operating states of the energy system is also possible, for example in the idle state of the energy system, in which the volume flow is zero, or during operation of the energy system, in which the volume flow is greater than zero. The present invention also permits plausibility checks by redundancy.

A number of advantages can be realized with the present invention. Thus, a risk of an amount of medium escaping through a leak, for example hydrogen, can be minimized in each operating mode, for example by means of a pressure limitation and reduction of the reaction speed. Faults, and in particular leakages, are detected independently of the operating mode of the energy system with high sensitivity.

The invention relates to a method for line pressure monitoring in a bidirectionally used line section of a connecting line device in an energy system. The method proceeds in the energy system. The invention further relates to an energy system.

The energy system is in particular an entity composed of a plurality of components, wherein the components are connected to one another to form a dedicated unit. In the present case, the energy system is a system for generating or providing energy, preferably electrical energy. Generally, the invention is not limited to certain types of energy systems. In the following, various preferred exemplary embodiments are described in this regard.

According to a preferred embodiment, the energy system is a house energy system. House energy systems are known in principle from the state of the art and are used to supply houses, for example low-energy houses, passive houses or zero-energy houses, with energy in the form of heat and in particular in the form of current, for example current from regenerative energy sources such as, for example, photovoltaic (PV) generators or small wind power plants. Such a house energy system provides the basis that the energy requirement of a house, in particular of a low-energy house, a passive house or a zero-energy house, can be completely covered from renewable energy sources both with regard to the current and heat requirement and thus consists of complete $CO_2$ freedom during operation. At least however, the electricity demand of a house can be covered almost completely from renewable energy sources, in particular by means of a PV generator and/or a small wind power plant, in the sense of seeking an increase in self-consumption.

Such a house energy system is described, for example, in patent applications WO 2017/089468 A1 and WO 2017/089469 A1 of the applicant, the disclosure of which being incorporated into the description of the present patent application.

According to a preferred embodiment, a house power system of the type mentioned comprises the following basic features:
- a DC feed point, preferably designed for a nominal voltage of 48 volts, and/or an AC feed point, preferably designed for a voltage of 230 volts or 110 volts, wherein the DC feed point and/or the AC feed point, during operation, is connected at least temporarily to an electrical equipment having a consumption power,
- a PV generator which is electrically connected at least temporarily to the DC feed point, in order to generate an electrical PV power,
- a fuel cell unit which is electrically connected at least temporarily to the DC feed point or to the AC feed point in order to generate an electrical fuel cell power,
- an electrolysis unit electrically connected to the DC feed point for generating hydrogen to be consumed by the fuel cell unit, wherein the electrolysis unit is supplied with an electrical electrolysis input power during operation,
- a hydrogen tank, in particular as a long-term energy storing device, which is, at least temporarily, fluidically connected to the fuel cell unit and to the electrolysis unit and which is provided to store hydrogen to be generated by means of the electrolysis unit and to be consumed by the fuel cell unit,
- a storage battery unit, in particular as a short-term energy storage device, which is electrically connected or to be connected to the DC feed point, such that an electrical PV power and an electrical fuel cell power can be stored in the storage battery unit, and an electrical electrolysis input power and a consumption power can be withdrawn from the storage battery unit; and
- a control module for controlling the house power plant.

According to the first aspect of the invention, a method is provided which comprises features of independent claim 1.

This is a method for line pressure monitoring. The line pressure monitoring can take place for various reasons. The line pressure monitoring device is preferably used to detect leakages in the line. However, only problems with regard to the flow of a medium through the line can easily be monitored and identified also.

According to the invention, the line pressure monitoring is carried out in a bidirectionally used line section of a connecting line device in an energy system, in particular in a house energy system, preferably in an energy system, in particular in a house energy system as described above.

The connecting line device comprises at least one bidirectionally used line section, wherein the individual components of the energy system, which are described in more detail below, are located on both sides of the bidirectional line section.

A first energy source device is located on a first side of the bidirectional line section. Accordingly, the system according to the invention first comprises a first energy source device. The first energy source device is provided to generate or provide energy. In particular, an energy source device is generally characterized in that it flows out more than it flows into it. The generation or production of the energy can take place in various ways. For example, the first energy source device can be designed as an electrolysis device. In a preferred embodiment, the first energy source device, in particular in the form of an electrolysis device, is designed to produce hydrogen H2. In the electrolysis, a chemical reaction for obtaining or producing substances is generally forced by means of electric current. The invention is not limited to this specific exemplary embodiment.

Furthermore, a first energy sink device is located on the first side of the bidirectionally used line section. In particular, an energy sink device is generally characterized in that it flows more into it than it flows out. According to a preferred embodiment, the first energy sink device is a fuel cell device. Fuel line devices per se are familiar to the person skilled in the art. Generally speaking, fuel cells convert a supplied fuel, such as hydrogen, and an oxidant into electrical energy. The invention is not limited to this specific exemplary embodiment.

A second energy source device and a second energy sink device are located on the other, second side of the bidirectional line section. The second energy source device is preferably provided as a storage device, in particular as a high-pressure storage device, in which the energy generated by the first energy source device, for example hydrogen, is stored up to its use, for example in the first energy sink device, for example a fuel cell device. If the second energy source device is provided as a high-pressure storage device, storage at pressures up to 700 bar is preferred. The second energy sink device is preferably provided as a medium-pressure storage device, in particular for temporarily storing hydrogen. In particular, storage at pressures between 20 and 60 bar is preferred in the second energy sink device. If such a second energy sink device is used, the energy generated in the first energy source device, for example hydrogen, first of all is transported to the second energy sink device and temporarily stored therein, before from there a storage in the second energy source device, for example in a high-pressure storage device, is performed.

The energy system on which the present invention is based comprise a connecting line device via which the first energy source device is connected to the second energy source device and the second energy source device is connected to the first energy sink device. The connecting line device preferably comprises the entirety of the line sections present in the energy system. The connecting line device or the line sections thereof are preferably designed in the form of pipes and/or hose lines. In this context, a line section preferably represents a part of the entire connecting line device. In the simplest case, a connecting line device comprises one single line section. However, it is preferably provided that the connecting line device comprises two or more line sections. Individual line sections can be designed as so-called unidirectional line sections, which means that a flow takes place in these line sections only in one direction. According to the invention, at least individual sections of the connection line device are now designed as bidirectional line sections. A bidirectional line section is a line section which is used bidirectionally, that is in two directions. A bidirectional line section is characterized in particular by the fact that it is used alternately and that, during operation of the energy system, a flow takes place in both directions of the line section. The number of line sections required can thus be significantly reduced.

Returning back to the embodiment described further above with the two modes of operation of the energy system, when using bidirectional line sections, a pressure change, in particular a pressure reduction, is required when changing the operating modes, for example from the first operating mode electrolysis with 20 to 60 bar to the second operating mode fuel cell operation at less than 20 bar.

For monitoring the line pressure in the bidirectional, that is bidirectionally used, line section of the connecting line device, the method according to the invention is characterized by the following steps:

By means of two pressure measuring devices, which are located spatially separated from one another in the bidirectional line section, a first pressure P1 and a second pressure P2, being prevalent at the locations of the pressure measuring devices, is detected respectively. The location of the pressure measurement can be any location, where the pressure measuring device is located or arranged in the bidirectional line section. Or, the location of the pressure measurement can be a position in the bidirectional line section, where the pressure measuring device detects, for example measures, taps or determines, the pressure in the bidirectional line section. The spatially separated pressure measuring devices are preferably located at one end of the bidirectional line section respectively; the detection of the pressure means in particular that the pressures are measured directly by means of the pressure measuring devices. According to a different embodiment, the pressures can also be detected by determining, example, calculating them, in particular indirectly, from certain parameters, in particular process parameters. The pressures can be detected continuously or else at specific time intervals or intervals, if appropriate also only if required, if conclusions are drawn from other components of the energy system that for example a leakage is suspected. The pressure measuring devices are provided, for example, as pressure sensors.

The method according to the invention further comprises the step of checking the line pressure in the bidirectional line section by means of an evaluation of the pressures detected by the pressure measuring devices, or the detected pressure values. This means that the detected pressures are analyzed in a suitable manner. Examples of this are explained in more detail in the further course of the description. The evaluation is carried out in such a way that the detected pressures are set in relation to one another, that is to say in particular into a relationship or into a ratio to one another. Examples of this are explained in more detail in the further course of the description.

The checking procedure, and here in particular the evaluation procedure, is preferably carried out in a control device. The control device can be either a separate control device, specifically used for this line pressure monitoring. Or, however, the control device is part of the main control device used for the energy system. The control device can be comprised by hardware components, or else may be formed by software components or by a combination of hardware and software components. In particular, the control device comprises a processor device and optionally also a memory device. By means of interfaces, which can be configured in a wireless or wired manner, the control device is connected at least temporarily to the pressure measuring devices in order to receive the detected pressures or pressure values therefrom. In addition, as will be explained in greater detail below, the control device may be designed to control, or else to trigger, further components of the energy system, such as valve devices and/or an expansion device and/or a flow limiting device, on the basis of the evaluated pressures or pressure values. In this way, after a checkup has taken place, in which, for example, it has been emerged that there is a leakage in the bidirectional line section, the energy system can be controlled in such a way that the discharge of medium from the leakage, in particular of hydrogen, is prevented, at least reduced.

When the pressure measuring devices are respectively located at the ends of the bidirectional line section, the method is preferably characterized by the following steps:
  a) via the two pressure measuring devices, which are located spatially separated from one another at a first end and at a second end of the bidirectional line section, a first pressure P1 prevailing at the first end of the bidirectional line section and a second pressure P2 prevailing at the second end of the bidirectional line section are detected;
  b) the first and second pressures or pressure values detected at the two ends of the bidirectional line section are evaluated, in particular in the control device of the energy system, in that they are set in relation to one another;

c) the pressure prevailing in the bidirectional line section is checked on the basis of the evaluation, in particular as to whether the bidirectional line section has a leakage.

In the following, different evaluation and checking procedures are described, which can be carried out, in particular electronically and preferably automatically, in the control device, either alone individually or in any combination.

According to a first exemplary embodiment, the evaluation of the pressures detected by the pressure measuring devices is performed by means of a limit pressure monitoring. In this case, the first pressure P1 and/or the second pressure P2 is/are compared against a predetermined limit pressure. In particular, according to this embodiment it is checked whether the first pressure P1 and/or the second pressure P2 falls below a predetermined minimum limit pressure ($P_{min}$). This is carried out in particular according to the formula $$P1 \text{ and/or } P2 < P_{min}$$

Is there no leakage in the bidirectional line section, the two pressures P1 and P2 at the respective ends of the bidirectional line section are preferably equally high. In particular, a leakage is present in the bidirectional line section, when the two pressures P1 and P2 differ from each other. Thus, according to this embodiment, not only the individual pressures P1 and P2 can get compared against the limit pressure respectively, but the two pressures P1 and P2 can additionally also be directly compared with one another.

According to a second exemplary embodiment or alternatively in addition to the above-mentioned first exemplary embodiment, the pressures detected by the pressure measuring devices are evaluated by a transverse comparison. This transverse comparison provides that the detected values of the first pressure P1 and of the second pressure P2 are subtracted from one another. A check is then made as to how the difference between the pressure values behaves in comparison with a predetermined comparison differential pressure value. For example, it can be checked whether the difference of the pressure values is greater than a predetermined maximum difference ($P_{delta,max}$). Is the difference greater than the predetermined maximum difference, this indicates a leakage within the bidirectional line section. In this case, the check is carried out in particular according to the formula $$(P1-P2) > P_{delta,max}.$$

Of course, the method according to this embodiment can also be implemented the other way round, or else a check is made against a differential pressure range. In the latter case, for example, a leakage can be excluded, if the determined difference of the pressure values lies within a predetermined differential pressure range.

According to a third exemplary embodiment or alternatively in addition to the above-mentioned first and/or second exemplary embodiment, the evaluation of the pressures detected by the by pressure measuring devices is performed by means of a plausibility comparison. In the case of a plausibility comparison, the detected pressures P1 and P2 and/or the difference formed from the two pressures are checked to determine, whether these values or the result are at all plausible, that is to say are probable or conclusive.

In particular, a plausibility comparison provides that the values of the first pressure P1 and of the second pressure P2 are subtracted from one another. A check is then made as to how the difference between the pressure values behaves in comparison with a predetermined plausibility differential pressure value. For example, it can be checked whether the difference of the pressure values is greater than a predefined maximum difference ($P_{delta,plausible}$). If the difference is greater than the predefined maximum difference, this indicates a leakage within the bidirectional line section. In this case, the check is carried out in particular according to the formula $$(P1-P2) > P_{delta,plausible}.$$

Of course, the method according to this embodiment can also be implemented the other way round, or else a check is made against a differential pressure range. In the latter case, for example, a leakage can be excluded, if the determined difference of the pressure values lies within a predetermined differential pressure range.

According to a further preferred exemplary embodiment, in order to increase the sensitivity of the line pressure monitoring during the monitoring process, it is realized that the volume flow in the bidirectional line section is reduced. This can be achieved, for example by means of a suitable flow limiting device, for example by means of a capillary tube. According to another embodiment, the volume flow in the bidirectional line section is ceased in order to increase the sensitivity of the line pressure monitoring during the monitoring process. This can take place, for example, by means of a suitable flow limiting device, by means of which the volume flow of the first energy source device or, depending on the mode of operation of the second energy source device is ceased. The flow limiting device can preferably also be designed as a device for reducing the line cross-section. Such an adjustment of the volume flow can also take place, for example, if a leakage has been detected in the bidirectional line section. The volume flow is then preferably at least throttled until the error has been eliminated.

The method according to the invention can be carried out in different operating modes of the energy system.

According to a preferred embodiment, the method is carried out in a first operating mode of the energy system, in which the energy system is in the idle state. In this idle state, the volume flow in the bidirectional line section is equal to zero. In particular, in the idle state, the volume in the connecting line device is minimized. Minimizing the volume of the connecting line device particularly takes place, in that certain valve devices, which are preferably shut-off valves, are closed. These are, for example, valve devices in front of the first energy source device and/or in front of the first energy sink device and/or in front of the second energy source device and/or in front of the second energy sink device. By means of the aforementioned measures, the sensitivity is increased, which increases the accuracy of the method. In the context of the present patent application, a valve device is preferably a component which is located behind an energy source device.

According to another preferred embodiment, the method is carried out in at least one second operating mode of the energy system in which the energy system is in the operating state. In the operating state, the volume flow in the bidirectional line section is greater than zero. If the energy system is designed in the manner described above, in a first alternative of the second operating mode, hydrogen can be produced, for example by means of electrolysis. This operating mode is described as electrolysis operation. In the electrolysis operation, the hydrogen generated in the first energy source device flows over the connecting line device and in particular also via the bidirectional line section in the direction of the second energy source device, in particular in the form of a high-pressure storage device, wherein the hydrogen is preferably previously and temporarily stored in a second energy sink device, in particular in the form of a medium-pressure storage device. In a second alternative of the second operating mode, the hydrogen flows from the second energy source device via the connecting line device and in particular via the bidirectional line section to the first energy sink device in the form of a fuel cell device. This operating mode is referred to as fuel cell operation. Leakages in the bidirectionally used line section lead to a pressure difference between P1 and P2, since the pressure on the side of the energy source device drops slowly or not at all. The pressure on the side of the energy sink device, on the other hand, drops, since hydrogen is consumed and flows off via the leakage.

If it is determined by means of the method after the check and evaluation that the bidirectional line section has a leakage, various measures can be taken. For example, the volume flow in the connecting line device, in particular in the bidirectional line section, is prevented, for example by closing corresponding valve devices. In another embodiment, the flow rate of the volume flow in the connecting line device, in particular in the bidirectional line section, is limited, for example by actuating a flow limiting device. In the latter case, in particular, the leakage volume flow can be reduced until the fault is eliminated. The components of the energy system required for the aforementioned measures can, for example, be controlled by means of the control device described above, but at least triggered.

According to the second aspect of the invention, an energy system is provided which comprises the features of independent claim 10.

Preferably, the method according to the first aspect of the invention is carried out in the energy system according to the second aspect of the invention, so that the energy system comprises means for carrying out the method according to the first aspect of the invention. With regard to the configuration and mode of operation of the energy system, full reference is also made to the disclosure of the first aspect of the invention, in order to avoid repetitions at this point.

The energy system according to the invention comprises a first energy source device as described above and a first energy sink device as described above, which are arranged on a first side of a bidirectionally used line section of a connecting line device. Furthermore, the energy system comprises a second energy source device as described above and a second energy sink device as described above, which are arranged on a second side of the bidirectionally used line section of the connection line device. The energy system also comprises two pressure measuring devices which are located spatially separated from one another in the bidirectional line section, preferably at the two ends of the bidirectional line section respectively. The pressure measuring devices are provided in such a way that they are capable to detect a first pressure or pressure value P1 and a second pressure or pressure value P2 prevailing at the locations of the pressure measuring devices. In addition, the energy system also comprises a device, in particular a control device, which is, respectively by means of an interface, connected at least temporarily to the two pressure measuring devices. This device is provided in such a way that it is capable to evaluate the first and second pressures detected or determined by the pressure measuring devices, and to check the line pressure in the bidirectional line section on the basis of the evaluation, in particular to that effect, whether the bidirectional line section has a leakage. The checking and the evaluation are preferably carried out in the manner described in the context of the method according to the invention.

It is preferred that the first energy source device is configured as an electrolysis device, in particular for producing hydrogen, and/or that the first energy sink device is configured as a fuel cell device and/or that the second energy source device is configured as a high-pressure storage device, in particular for storing hydrogen, and/or that the second energy sink device is configured as a medium-pressure storage device, in particular for intermediate storage of hydrogen.

In the following a number of means are explicitly described, which are preferably used for carrying out the method. With regard to the functionality of these means, reference is therefore also made to the corresponding embodiments for the method according to the invention further above and is referred to.

Preferably, the first energy source device and/or the first energy sink device is/are connected to the connecting line device via a valve device, in particular via a shut-off valve. A shut-off valve, which is, for example, a solenoid valve, serves in particular to shut-off a volume flow.

According to a further preferred embodiment, a valve device, in particular in the form of a check valve device, is arranged in a line section of the connecting line device extending between a second end of the bidirectional line section and the second energy sink device. By means of the check valve device, the line section of the connecting line device connected thereto is closed in terms of flow in one direction, while the line section remains free of flow in the other direction, that is to say remains open. The check valve device makes it possible, in particular, that a volume being present in the connecting line device can flow in one direction, but cannot flow back from this direction. In the context of the present patent application, a check valve device is preferably a component which is located in front of an energy sink device.

According to a further embodiment, there is/are provided, in a line section of the connecting line device running between a second end of the bidirectional line section and the second energy source device, a valve device, in particular in the form of a shut-off valve, and/or an expansion device and/or a flow limiting device. With regard to the configuration and mode of operation of these components, reference is made to the description further above in the context of the method according to the invention.

According to a preferred embodiment, the energy system comprises a compressor device which is arranged in the connecting line device and which is connected to the second energy source device. Via the compressor device, the medium generated by the first energy source device, for example hydrogen, gets stored in the second energy source device. If the energy system comprises a second energy sink device, which serves as an intermediate storage service, the compressor device is preferably arranged between the second energy sink device and the second energy source device.

The present invention can basically be applied to all systems with a bidirectionally used line and pressure-independently, in particular to storage systems with a separate source and sink, preferably to hydrogen storage systems. The present invention is suitable for energy systems with large distances between an energy source device and an energy sink device, in particular also for systems having an internally laid and/or open-accessible storage line.

BRIEF DESCRIPTION OF THE DRAWINGS

The invention will now be explained in more detail with reference to an exemplary embodiment with reference to the accompanying drawings, wherein.

DETAILED DESCRIPTION OF THE PREFERRED EMBODIMENTS

Figure 1:
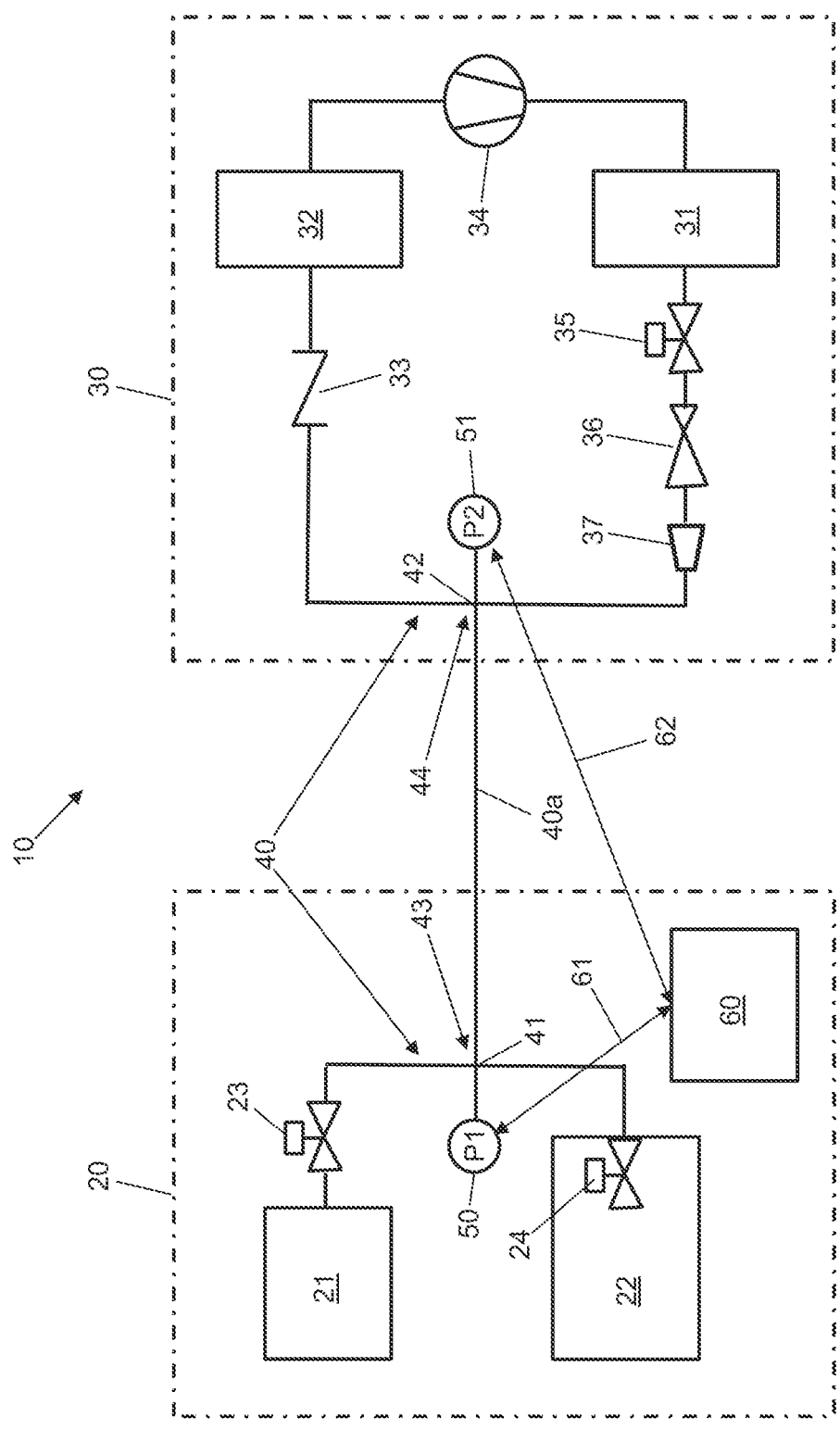
FIG. 1 is a schematic view of an energy system according to the invention, in which the method according to the invention can be carried out.
Figure 2:
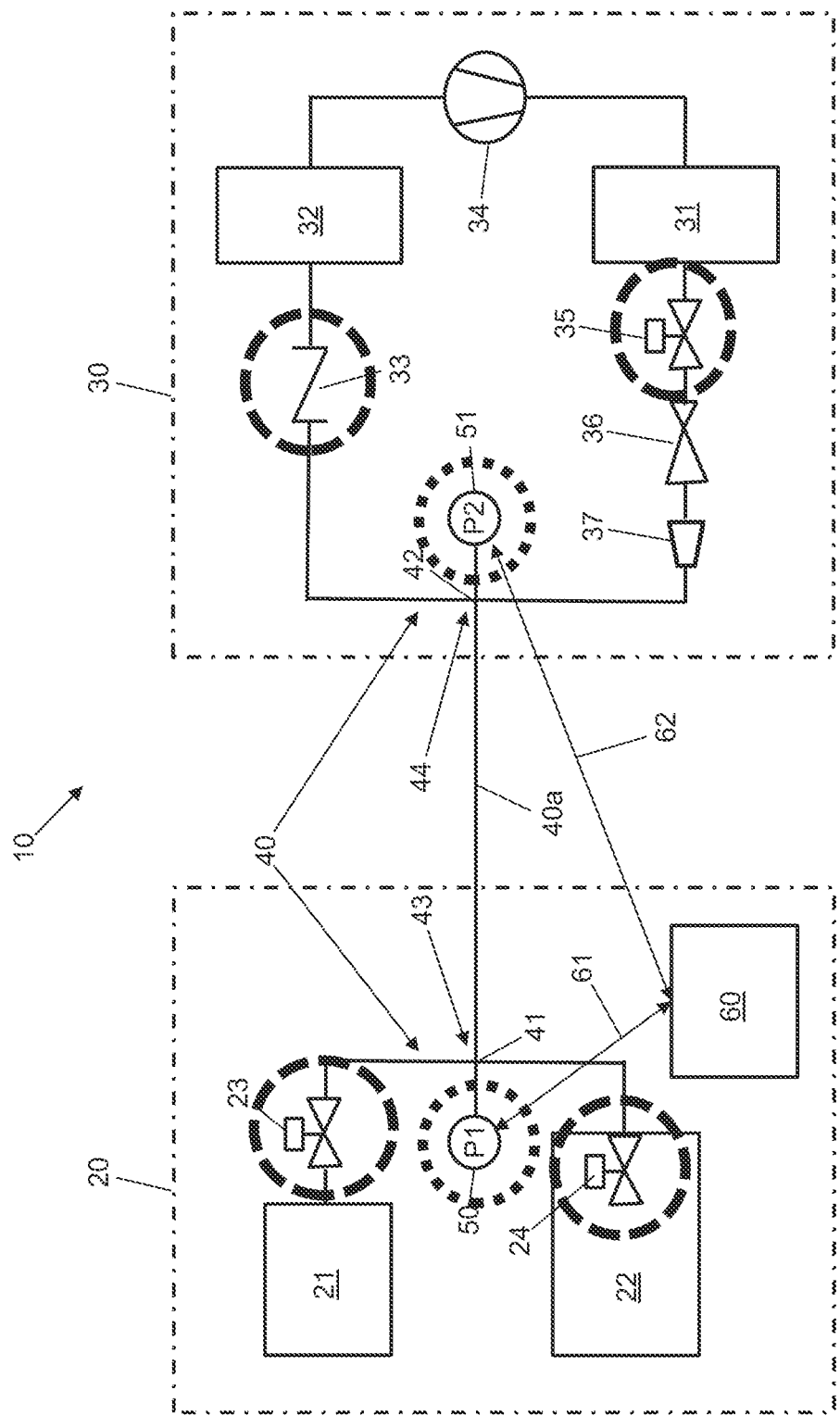
FIG. 2 depicts the process of the method according to the invention, wherein a first mode of operation of the energy system is shown.
Figure 3:
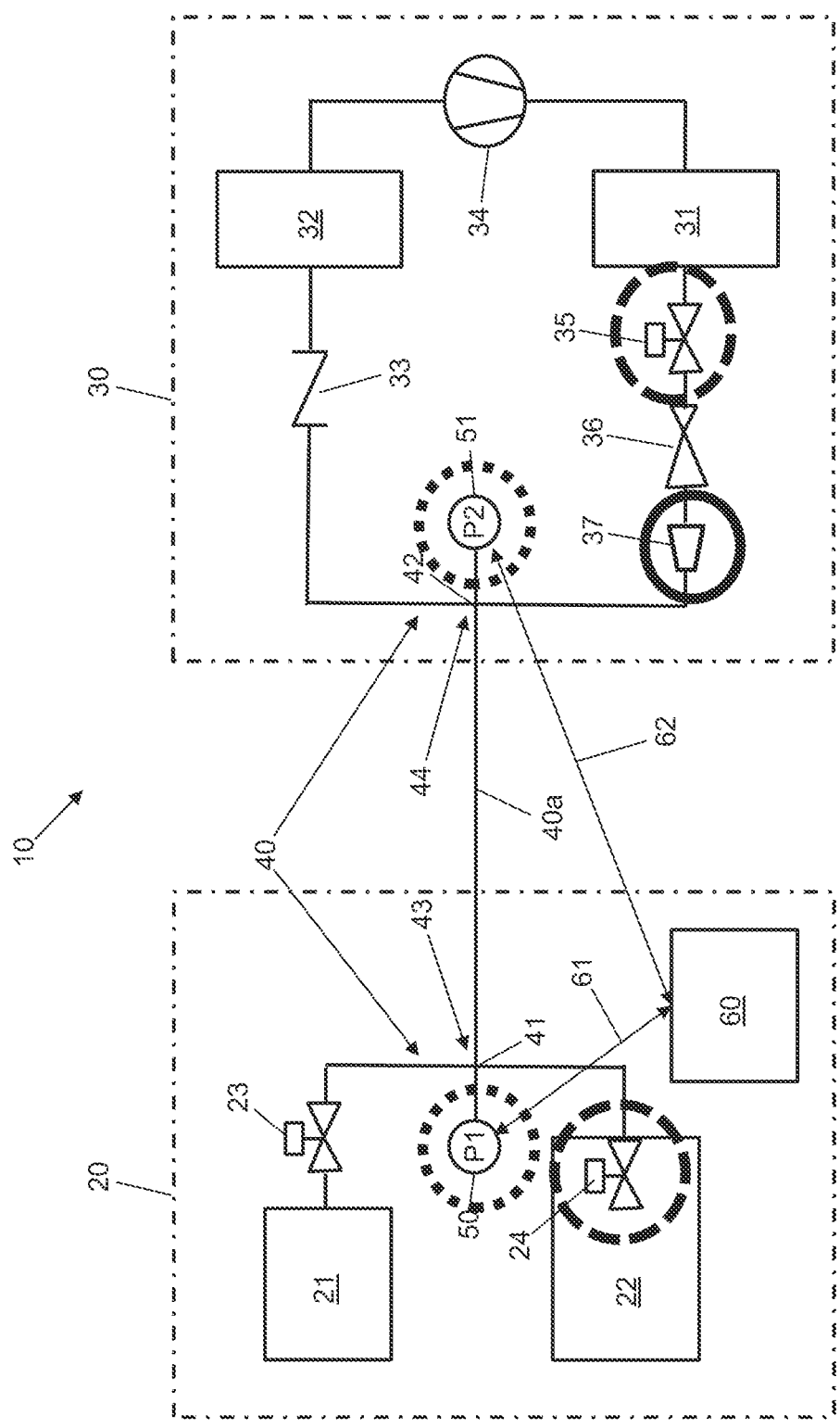
FIG. 3 depicts the process of the method according to the invention, wherein a second mode of operation of the energy system is shown.

FIGS. 1 to 3 show an energy system 10 which is used as a house energy system. In FIG. 1, the basic structure of the energy system 10 is first described. The method for line pressure monitoring according to the invention is performed in the energy system 10. The process flow in different modes of operation of the energy system 10 is explained with reference to FIGS. 2 and 3.

As can be seen from FIG. 1, energy system 10 initially comprises a first subsystem 20 which is configured as an inner system. That is, the first subsystem 20 is provided inside the house. In addition, the energy system 10 comprises a second subsystem 30 in the form of an outer system. That is, the second subsystem 30 is external to the house.

The first subsystem 20 comprises a first energy source device 21, which is provided as an electrolysis device for producing hydrogen. In addition, the first subsystem 20 comprises a first energy sink device 22, which is provided as a fuel cell device.

The second subsystem 30 comprises a second power source device 31, which is provided as a high-pressure storage device. The hydrogen produced is stored in the high-pressure storage device at up to 700 bar. In addition, the second subsystem 30 comprises a second energy sink device 32 in the form of a medium-pressure storage device, in which the produced hydrogen is temporarily stored at pressures between 20 and 60 bar, before it is finally stored in the high-pressure storage device.

The individual components of energy system 10 are connected with one another via a connecting line device 40, which consists of a number of line sections. At least one line section 40a is configured as a so-called bidirectional line section. This means that line section 40a is bidirectionally used during operation of the energy system 10 and is flown through in both directions. In the embodiment shown the bidirectional line section 40a connects the components of the first subsystem 20 to the components of the second subsystem 30.

The first energy source device 21 is connected to the connecting line device 40 via a valve device 23. The first energy sink device 22 is connected to the connection device 40 via a valve device 24. The valve devices 23, 24 are preferably shut-off valves, for example solenoid valves.

As shown in FIG. 1, the first energy source device 21 and the first energy sink device 22 are provided on a first side 43 of the bidirectional line section 40a at a first end 41 of the bidirectional line section 40a, whilst the second energy source device 31 and the second energy sink device 32 are provided on a second side 44 of the bidirectional line section 40a at a second end 42 of the bidirectional line section 40a.

The hydrogen produced in the first energy source device 21 by means of electrolysis leaves the first energy source device 21 via the connecting line device 40 and flows in particular via the bidirectional line section 40a into the second subsystem 30 and there via a check valve device 33 into the second energy sink device 32 functioning as the medium-pressure storing device. The second energy sink device 32 serves as an intermediate storage device for the hydrogen. Since the hydrogen temporarily stored in the second energy source device 32 is to leave the latter only in one direction, namely in the direction of the second energy source device 31, only the check valve device 33 is provided. A shut-off valve is therefore not required.

By means of a compressor device 34, which is in particular in the form of a piston compressor, the hydrogen temporarily stored in the second energy source device 32 is stored in the second energy source device 31, which is a high-pressure storage device. The hydrogen is compressed by the compressor device 34 to such an extent that it can be stored in the second energy source device 31 at pressures of up to 700 bar.

The hydrogen stored in the second energy source device 31 is used for the operation of the first energy sink device 22 in the form of the fuel cell device. However, the fuel cell device can only operate at pressures of less than 20 bar. Therefore, the hydrogen stored in the second energy source device in form of the high-pressure storage device is removed from the second energy source device 31, is guided via a valve device 35, which can be a shut-off valve, in particular a solenoid valve, and is guided to an expansion device 36 in the form of a pressure reducer. The hydrogen can then, in particular, flow through a flow limiting device 37, which is preferably configured as a device for reducing the line cross-section. This is, for example, a capillary tube. The sensitivity of the method according to the invention described in FIGS. 2 and 3 is improved by means of the flow limiting device 37. From there, the pressure reduced hydrogen is supplied via the connecting line device 40, and in this case in particular also via the bidirectional line section 40a, to the first energy sink device 22 in the form of the fuel cell device and consumed there.

For measuring the pressure at the respective ends 41, 42 of the bidirectional line section 40a, two pressure measuring devices 50, 51 are provided, for example in the form of pressure sensors. The pressure measuring devices 50, 51 are spatially separated from one another, the first pressure measuring device 50 being located at the first end 41 of the bidirectional line section, whilst the second pressure measuring device 51 is located at the second end 42 of the bidirectional line section 40a. The pressure measuring device 50 at the first end of the bidirectional line section 40a detects a first pressure P1, whilst the second pressure measuring device 51 at the second end 42 of the bidirectional line section 40a detects a second pressure P2.

The method according to the invention for monitoring the line pressure in the bidirectional line section 40a, which will be explained later with regard to FIGS. 2 and 3, provides that the detected pressures P1 and P2 are evaluated. This is preferably performed in a control device 60, which in the embodiment is assigned to the first subsystem 20. Of course, the control device 60 can also be located elsewhere. The control device 60 is at least temporarily connected to the pressure measuring devices 50, 51 via corresponding interfaces 61, 62, which is represented by corresponding arrows. A check of the line pressure in the bidirectional line section 40a takes place in the control device 60 by means of an evaluation of the pressures P1 and P2 detected by pressure measuring devices 50, 51, by setting the detected pressures P1 and P2 in relation to one another. By means of the method according to the invention, it is in particular checked whether the bidirectional line section 40*a* has a leakage.

The energy system 10 illustrated in FIGS. 1 to 3 represents a partial area of an overall house energy system, which is a multi-hybrid house energy storage system that is electrically autonomous and that is completely based on renewable energies.

The multi-hybrid house energy storage system makes it possible that the electrical energy generated by a photovoltaic (PV) system, a small wind power plant or the like is distributed as required to the entire year. The system acts as an island system independent of the electrical network. Rather, the system is to ensure the electrical autarchy of the house, so that no electrical energy has to be drawn from the power grid over the entire year.

The primary task of the house power system is to make available the recovered electrical energy from photovoltaic (PV) modules or the like to the consumer in the household. Secondary, electrical energy excesses can be temporarily stored in a battery short-term storage device at times of low load or high irradiation. Tertiary, the electrical energy can be medium to long-term stored in the hydrogen long-term storage as gaseous hydrogen for times of low irradiation such as night, winter or the like, and can be needs-based made available again at any time by means of a fuel cell.

Besides to energy-related tasks, the system also functions as a controlled living room ventilation by means of a built-in ventilation device.

The hydrogen produced in the electrolysis device flows via the hydrogen line into the outwardly provided pressure storage system.

In the event of a lack of or insufficient PV energy, energy is supplied from the battery to cover the consumer load. If the energy stored in the short-term storage device is not sufficient, the fuel cell device can satisfy the additional electrical energy requirement. In the fuel cell operation, the hydrogen flows from the pressure storage system to the fuel cell device via the hydrogen line.

The simultaneous operation of the fuel line device and the electrolysis device is excluded. The entire system is operated centrally via an energy manager with predictive energy management.

In principle, the second subsystem is provided for operation in the outer region, but can also be erected and operated within a special region of the house under certain conditions.

The procedure of the method according to the invention will now be described with reference to FIGS. 2 and 3. In FIGS. 2 and 3, different operating modes, that is different operating states, of the energy system 10 are illustrated.

According to the energy system 10 as shown in FIG. 2, which is described in general terms with regard to FIG. 1, the energy system 10 is in a first operating state, which is to be the idle state. In the line pressure monitoring in the idle state, there is no volume flow in the connecting line device 40, and in particular in the bidirectional line section 40*a*. For this purpose, valve devices 23, 24, and 35 are closed. In any case, the check valve device 33 does not permit any return flow. The line volume is minimized by the corresponding position of the valve devices, which are identified by circles marked by bold and dashed lines. Small and strong leakages in the bidirectional line section 40*a* are detected equally well by the pressure measuring devices 50, 51, for example by detecting a limit pressure drop. This is indicated in FIG. 2 by the circles shown in bold and dotted lines. Errors in the pressure measuring devices 50, 51 can be excluded, for example, by plausibility checks. The evaluation of the pressures P1 and P2 detected by the pressure measuring devices 50, 51, in particular in the control device 60, is preferably carried out in the manner described in the general description of the invention further above.

According to the energy system 10 as shown in FIG. 3, which is described in general terms with regard to FIG. 1, the energy system 10 is in a second operating mode, which is intended to be an operating state. Here, the operating state is fuel cell operation. Same applies to the operating state, which is procedure of hydrogen during electrolysis operation. The line pressure monitoring in the bidirectional line section 40*a* in the fuel cell operation takes place when the valve device 24 of the second energy sink device 22 is open and when the valve device 35 of the second energy source device 31 is open, which are marked by circles represented by bold and dashed lines. In the connecting line device 40, and in particular in the bidirectional line section 40*a*, there is a volume flow that is greater than zero. The hydrogen stored in the second energy source device 31 can thus flow, inter alia via the bidirectional line section 40*a*, into the first energy sink device 22 in the form of the fuel cell device. Slight or partial leakages in the bidirectional line section 40*a* lead to a pressure difference between the pressures P1 and P2, which are detected by the pressure measuring devices 50, 51, which is indicated by the circles represented in bold and dotted lines. The pressure difference is due to the fact that in the event of a leakage in the bidirectional line section 40*a* on the side of the second energy source device 31, that is to say the pressure P2, drops slowly or not at all. On the other hand, the pressure on the side of the first energy sink device 22, that is to say the pressure P1, which is located behind the leakage in the bidirectional line section 40*a* because of the arrangement of the pressure measuring device 50, drops, however, since hydrogen continues to be consumed and can flow-off via the leakage in the bidirectional line section 40*a*. Strong leakages or a line break can optionally also be detected if the pressure drops beneath a limit pressure, which is indicated by the circles represented in bold and dotted lines. The sensitivity of the method can be improved by reducing the flow rate by means of the flow limiting device 37, which is, for example, a capillary tube. This is indicated in FIG. 3 by the bold marked circle. Any errors in the pressure measuring devices 50, 51 can be excluded, for example, by plausibility checks. The evaluation of the pressures P1 and P2 detected by the pressure measuring devices 50, 51, in particular in the control device 60, is preferably performed in the manner described in the general description of the invention further above.

LIST OF REFERENCE NUMERALS

10 Energy system (house energy system)
20 First subsystem (inner system)
21 First energy source device (electrolysis device)
22 First energy sink device (fuel cell device)
23 Valve device
24 Valve device
30 Second subsystem (outer system)
31 Second energy source device (high-pressure storage device)
32 Second energy sink device (medium-pressure storage device)
33 Check valve device
34 Compressor device
35 Valve device
36 Expansion device (pressure reducer)

37 Flow limiting device (capillary tube)
40 Connecting line device
40a Bidirectional line section
41 First end of the bidirectional line section
42 Second end of the bidirectional line section
43 First side of the bidirectional line section
44 Second side of the bidirectional line section
50 First pressure measuring device
51 Second pressure measuring device
60 Control device
61 Interface
62 Interface
P1 First pressure
P2 Second pressure

The invention claimed is:

1. A method for line pressure monitoring in a bidirectionally used line section (40a) of a connecting line device (40) in an energy system (10) wherein a first energy source device (21) and a first energy sink device (22) are provided on the first side (43) of the bidirectionally used line section (40a), and wherein a second energy source device (31) and a second energy sink device (32) are provided on the second side (44) of the bidirectionally used line section (40a), characterized in that by means of two pressure measuring devices (50, 51), which are provided spatially separated from one another in the bidirectionally used line section (40a), a first pressure (P1) and a second pressure (P2) prevailing at the locations of the pressure measuring devices (50, 51) are detected, and in that a check of the line pressure in the bidirectionally used line section (40a) is carried out by means of an evaluation of the pressures (P1, P2) detected by the pressure measuring devices (50, 51), by setting the detected pressures (P1, P2) in relation to one another.

2. The method according to claim 1, characterized by the following steps: a) via the two pressure measuring devices (50, 51), which are located spatially separated from one another at a first end (41) and at a second end (42) of the bidirectionally used line section (40a), a first pressure (P1) prevailing at the first end (41) of the bidirectionally used line section (40a) and a second pressure (P2) prevailing at the second end (42) of the bidirectionally used line section (40a) are detected; b) the first and second pressures (P1, P2) detected at the two ends (41, 42) of the bidirectionally used line section (40a) are evaluated, in that they are set in relation to one another; c) the pressure prevailing in the bidirectionally used line section (40a) is checked on the basis of the evaluation.

3. The method according to claim 1, characterized in that the evaluation of the pressures (P1, P2) detected by the pressure measuring devices (50, 51) is carried out by means of a limit pressure monitoring, in that the first pressure (P1) and/or the second pressure (P2) is/are compared against a predetermined limit pressure.

4. The method according to claim 1, characterized in that the evaluation of the pressures (P1, P2) detected by the pressure measuring devices (50, 51) is carried out by a transverse comparison, in that the values of the first pressure (P1) and of the second pressure (P2) are subtracted from one another, and in that a check is made as to how the difference of the pressure values behaves in comparison with a predetermined comparison differential pressure value or comparison differential pressure value range.

5. The method according to claim 1, characterized in that the evaluation of the pressures (P1, P2) detected by the pressure measuring devices (50, 51) is carried out by means of a plausibility comparison in that the values of the first pressure (P1) and of the second pressure (P2) are subtracted from one another, and in that a check is made as to how the difference of the pressure values behaves in comparison with a predetermined plausibility pressure differential pressure value or plausibility differential pressure range.

6. The method according to claim 1, characterized in that, in order to increase the sensitivity of the line pressure monitoring, the volume flow is limited in the bidirectionally used line section (40a).

7. The method according to claim 1, characterized in that the method is carried out in a first operating mode of the energy system (10), in which the energy system (10) is in the idle state, in which the volume flow in the bidirectionally used line section (40a) is zero, and in which the volume in the connecting line device (40) is minimized.

8. The method according to claim 1, characterized in that the method is carried out in at least one second operating mode of the energy system (10), in which the energy system (10) is in the operating state, in which the volume flow in the bidirectionally used line section (40a) is greater than zero.

9. The method according to claim 1, characterized in that, if it is determined on the basis of the evaluation that the bidirectionally used line section (40a) has a leakage, the volume flow in the bidirectionally used line section (40a) is stopped, or the flow rate of the volume flow in the bidirectionally used line section (40a), is limited.

10. The method according to claim 1 wherein line pressure monitoring is used to determine whether the bidirectionally used line section (40a) has a leakage.

11. The method according to claim 1 wherein the energy system (10) comprises a home energy system.

12. The method according to claim 1 wherein the evaluation of the pressures (P1, P2) detected by the pressure measuring devices (50, 51) comprises checking whether the first pressure (P1) and/or the second pressure (P2) falls below a predetermined minimum limit pressure (Pmin).

13. The method according to claim 1 wherein the bidirectionally used line section (40a) is disposed in a control device (60) of the energy system (10).

14. The method according to claim 1, characterized in that during the monitoring process, the volume flow in the bidirectionally used line section (40a) is adjusted.

15. An energy system (10) comprising a first energy source device (21) and a first energy sink device (22), which are provided on a first side (43) of a bidirectionally used line section (40a) of a connecting line device (40), and further comprising a second energy source device (31) and a second energy sink device (32), which are provided on a second side (44) of the bidirectionally used line section (40a) of the connecting line device (40), further comprising two pressure measuring devices (50, 51), which are provided spatially separated from one another in the bidirectionally used line section (40a), and which are provided in such a way that they are capable of detecting a first pressure (P1) and a second pressure (P2) prevailing at the locations of the pressure measuring devices (50, 51), and further comprising a device which is connected at least temporarily to the two pressure measuring devices (50, 51) via an interface (61, 62), said device being provided in such a way that it is capable of evaluating the first and second pressures (P1, P2) detected or determined by the pressure measuring devices (50, 51), and to check the line pressure on the basis of the evaluation.

16. The energy system according to claim 15, characterized in that it comprises means for carrying out the method according to anyone of claims 1 to 10.

17. The energy system according to claim 15, characterized in that the first energy source device (21) is configured as an electrolysis device for producing hydrogen, and/or in that the first energy sink device (22) is configured as a fuel cell device and/or in that the second energy source device (31) is configured as a high-pressure storage device for storing hydrogen, and/or in that the second energy sink device (32) is configured as a medium-pressure storage device for intermediate storage of hydrogen.

18. The energy system according to claim 15, characterized in that the first energy source device (21) and/or the first energy sink device (22) are connected to the connecting line device (40) via a valve device.

19. The energy system according to claim 18 wherein the valve device (23, 24) comprises a shut-off valve.

20. The energy system according to claim 15, characterized in that a valve device is arranged in a line section of the connecting line device (40) extending between a second end (42) of the bidirectionally used line section (40a) and the second energy sink device (32).

21. The energy system according to claim 20 wherein the valve device comprises a check valve device (35).

22. The energy system according to claim 15, characterized in that a valve device (35) and/or an expansion device (36) and/or a flow limiting device (37) is/are arranged in a line section of the connecting line device (40) extending between a second end (42) of the bidirectionally used line section (40a) and the second energy source device (31).

23. The energy system according to claim 22 wherein the valve device (35) comprises a shut-off valve.

24. The energy system according to claim 15 wherein the energy system comprises a house energy system.

25. The energy system according to claim 15 wherein the device comprises a control device (60).

26. The energy system according to claim 15 wherein the evaluation determines whether the bidirectionally used line section (40a) has a leakage.

* * * * *